US008664612B2

(12) United States Patent
Luryi et al.

(10) Patent No.: US 8,664,612 B2
(45) Date of Patent: Mar. 4, 2014

(54) LAYERED SEMICONDUCTOR SCINTILLATOR

(75) Inventors: Serge Luryi, Old Field, NY (US); Arsen Subashiev, Centereach, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 100 days.

(21) Appl. No.: 13/316,706

(22) Filed: Dec. 12, 2011

(65) Prior Publication Data

US 2012/0161015 A1 Jun. 28, 2012

Related U.S. Application Data

(60) Provisional application No. 61/460,199, filed on Dec. 28, 2010.

(51) Int. Cl.
*G01T 1/20* (2006.01)
*G01T 1/00* (2006.01)

(52) U.S. Cl.
USPC ............... 250/366; 250/486.1; 250/483.1

(58) Field of Classification Search
USPC ............... 250/366, 486.1, 483.1, 370.01
See application file for complete search history.

(56) References Cited

U.S. PATENT DOCUMENTS

| 6,674,098 | B1 * | 1/2004 | Niki et al. ................. 257/102 |
| 7,048,872 | B2 * | 5/2006 | Derenzo et al. ......... 252/301.6 R |
| 7,265,354 | B2 | 9/2007 | Kastalsky et al. |
| 2012/0056096 | A1 | 3/2012 | Abeles et al. |

OTHER PUBLICATIONS

R. Hofstadter, "Alkali Halide Scintillation Counters", Phys. Rev. 74/Letters to the Editor, (1948), pp. 100-101.
A. Kastalsky, et al., "Semiconductor High-Energy Radiation Scintillation Detector", Nuclear Instruments and Methods in Physics Research, (2006), pp. 650-656, A 565.
S. Luryi, et al., "Semiconductor Scintillator for 3-Dimensional Array of Radiation Detectors" Future Trends in Microelectronics: From Nanophotonics to Sensors to Energy, (2010), pp. 331-346, Hoboken, New Jersey.
A. Taguchi, et al., "Trap Level Characteristics of Rare-Earth Luminescence Centers in III-V Semiconductors", J. Appl. Phys. (1996), pp. 4330-4334, vol. 79(8), American Institute of Physics.
S. Luryi, "Impregnated Semiconductor Scintillator", International Journal of High Speed Electronics and Systems, (2008), pp. 215-224, vol. 18, No. 4.
S. Lourdudoss, et al., "Hydride Vapor Phase Epitaxy Revisited", IEEE Journal of Selected Topics in Quantum Electronics, (1997), pp. 749-767, vol. 3, No. 3.

(Continued)

*Primary Examiner* — David Porta
*Assistant Examiner* — Faye Boosalis
(74) *Attorney, Agent, or Firm* — Lawrence G. Fridman (57) ABSTRACT

A scintillator detector of high-energy radiation comprising a semiconductor slab that is composed of alternating layers of barrier and well material. The barrier and well material layers are direct bandgap semiconductors. Bandgap of the well material is smaller than the bandgap of the barrier material. The combined thickness of the well layers is substantially less than the total thickness of said slab. The thickness of the barrier layers is substantially larger than the diffusion length of minority carriers. The thickness of the well layers is sufficiently large to absorb most of the incident scintillating radiation generated in the barrier layers in response to an ionization event from interaction with an incident high-energy particle.

20 Claims, 9 Drawing Sheets

(56) References Cited

OTHER PUBLICATIONS

F. Gao, et al., "Gamma-Ray Interaction in Ge: A Monte Carlo Simulation", Nuclear Instruments and Methods in Physics Research, (2007), pp. 286-290, B255.

Arsen Subashiev, et al., "Urbach Tail Studies by Luminescence Filtering in Moderately Doped Bulk InP", Applied Physics Letters, (2010), pp. 1-3, vol. 97, 181914.

Oleg Semyonov, et al., "Radiation Efficiency of Heavily Doped Bulk n-InP Semiconductor", Journal of Applied Physics, (2010), pp. 1-7, vol. 108, 013101.

\* cited by examiner

LAYERED SEMICONDUCTOR SCINTILLATOR

REFERENCE TO RELATED APPLICATIONS

This application claims priority of U.S. Provisional Application Ser. No. 61/460,199 filed by the inventors on Dec. 28, 2010.

STATEMENT OF GOVERNMENT INTEREST

This invention was made with United States government support under grant number 2008-DNA-007-AR1002 awarded by the Department of Homeland Security and grant number HDTRA1-08-1-0011 awarded by the Defense Threat Reduction Agency. The government has certain rights in the invention.

FIELD OF THE INVENTION

The invention relates in general to scintillators. In particular, the invention relates to implementation of high-energy radiation scintillator detectors.

BACKGROUND OF THE INVENTION

Most scintillators known in the prior art are implemented in wide-gap insulating materials doped ("activated") with radiation centers. A classical example of a solid-state scintillator is sodium iodide activated with thallium (NaI:Tl), introduced by Hofstadter more than 60 years ago. Because of the much longer wavelength of the scintillation associated with the activator energy levels, compared to the interband absorption threshold, the insulating scintillators are very transparent to their own luminescence. However, this advantage comes at a price in the transport of carriers to the activator site. Individual carriers have a poor mobility in insulators and transport efficiency requires that the generated electrons and holes form excitons and travel to the radiation site as neutral entities. The energy resolution even in the best modern scintillators does not compare well with that in semiconductors. One of the fundamental reasons for poor resolution is that the luminescent yield in dielectric scintillators is controlled by reactions that are nonlinear in the density of generated electron-hole pairs, such as the formation of excitons at low densities and the Auger recombination at high densities.

Such nonlinear processes do not exist in direct-gap doped semiconductors, where interaction with gamma radiation induces minority carriers while the concentration of majority carriers does not measurably change. Every reaction on the way to luminescence, including Auger recombination, is linear with respect to the concentration of minority carriers. One can therefore expect that doped semiconductor scintillators will not exhibit effects of non-proportionality and their ultimate energy resolution could be on par with that of diode detectors implemented in the same material.

Typically, scintillators are not made of semiconductor materials. The key issue in implementing a semiconductor scintillator is how to make the material transmit its own infrared luminescence, so that photons generated deep inside the semiconductor slab could reach its surface without tangible attenuation. However, semiconductors are usually opaque at wavelengths corresponding to their radiative emission spectrum. The inventors have been working on the implementation of radiation detectors based on direct-gap semiconductor scintillator wafers, like InP or GaAs. For the exemplary case of InP the scintillation spectrum is a band of wavelengths near 920 nm. The initial approach was to make InP relatively transparent to this radiation by doping it heavily with donor impurities, so as to introduce the Burstein shift between the emission and the absorption spectra. Because of the heavy doping, the edge of absorption is blue-shifted relative to the emission edge by the carrier Fermi energy. However, Burstein's shift by itself does not provide adequate transparency at room temperature. The problem is that attenuation of the signal depends on depth of the interaction site into the semiconductor (see Serge Luryi and Arsen Subashiev, "Semiconductor Scintillator for 3-Dimensional Array of Radiation Detectors" in *Future Trends in Microelectronics: From Nanophotonics to Sensors to Energy*, ed. by S. Luryi, J. M. Xu, and A. Zaslaysky, Wiley Interscience, Hoboken, N.J. (2010) pp. 331-346.)

The transparency issue is of critical importance and one is concerned with new ways to enhance the photon delivery to the semiconductor surface.

One possibility is to implement a semiconductor version of activated scintillator, similar in principle to NaI:Tl, by doping the semiconductor with high efficiency radiative centers that emit below-bandgap light. It is important that the excited electron-hole pairs be efficiently transferred to the radiative center. In the case of InP, this energy transfer probability was shown to be high for certain trivalent luminescent ions incorporated in the host lattice. The system InP:Yb3+ seems to work at cryogenic temperatures, producing emission near 1 μm—well below the bandgap of InP. However, at room temperature, its performance is degraded by fast non-radiative de-excitation of Yb ions.

Other ideas for implementing transparent semiconductor scintillators include replacing luminescent ions by semiconductor wells or "impregnations" of lower bandgap. This idea was proposed in Kastalsky, Luryi, et al. publication, (see "Semiconductor high-energy radiation scintillation detector," *Nucl. Instr. and Meth. in Phys. Research* A 565, pp. 650-656 (2006) and in U.S. Pat. No. 7,265,354 to Kastalsky et al. and further discussed by Luryi (see "Impregnated Semiconductor Scintillator," *International Journal of High Speed Electronics and Systems*, vol. 18, No 4 pp. 973-982 (2008)).

The epitaxially grown structure comprises two alternating materials that are lattice-matched to each other. The materials are assumed to have different energy gaps, with the second material having the lower bandgap, $E_{G1} > E_{G2}$. The essential idea is that the total volume occupied by the second material is small compared to that occupied by the first material. The ratio of these volumes defines a "duty cycle" factor S and the absorption coefficient of the composite structure is reduced by this factor. For example, if a 2 μm-thick InP layers are alternated by a 20 nm-thick layers of InGaAsP, the volume ratio is 100 (δ=0.01).

Figure 1:
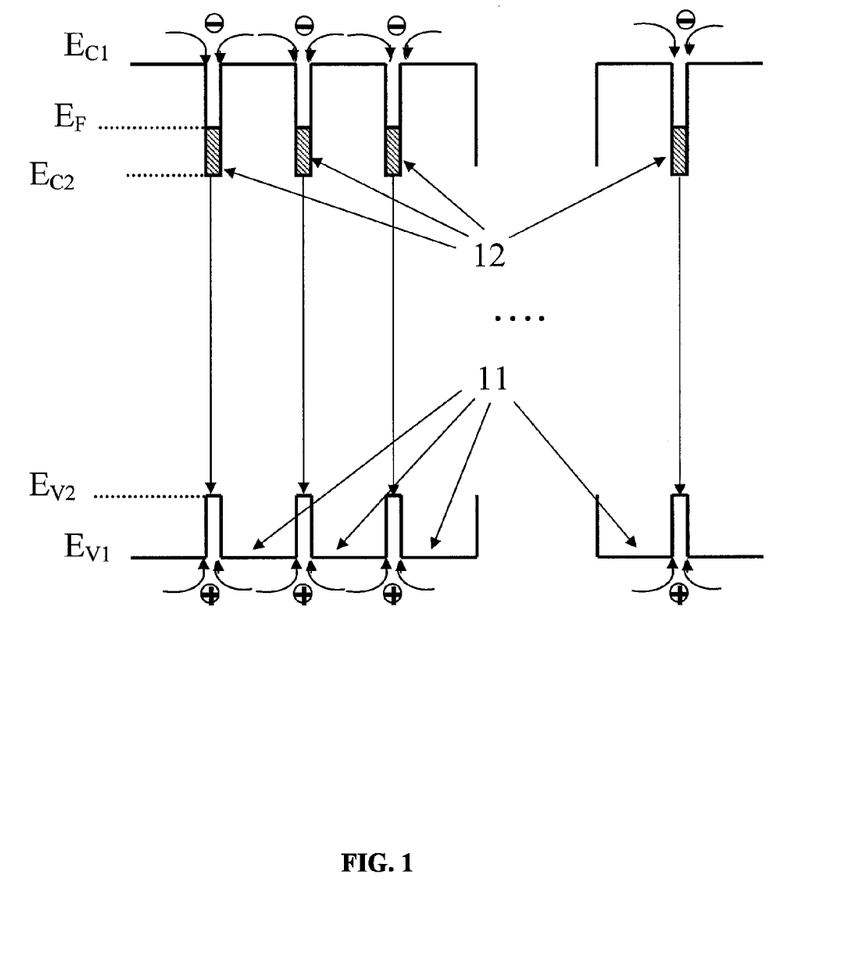
FIG. 1 is a schematic band diagram of the prior-art detector.

We are referring now to FIG. 1 which is a schematic band diagram of the prior-art detector as disclosed by Kastalsky et al. The layered detector comprises a sequence of alternating barrier layers 11 and well layers 12 where the thickness of barrier layers is limited to about 2 μm by the requirement that it must be much smaller than the diffusion length of minority carriers. The band diagram of FIG. 1 shows the conduction band edges $E_{Ci}$ and the valence band edges $E_{Vi}$ of the constituent materials, where i=1 refers to the barrier material and i=2 refers to the well material. Also shown in FIG. 1 is the Fermi level $E_F$ position of which in the band diagram corresponds to n-type doped semiconductor.

The crucial requirement for the structure disclosed by Kastalsky et al. publication and patent and illustrated in FIG. 1 is that the distance between the narrow-gap wells must be shorter than the diffusion length $L_D$ of carriers in the wide-gap material, which guarantees that most of the light emission occurs in the wells. This requirement limits the separation between wells to a few microns and is very hard to implement in practice, where one is interested in thick scintillator structures, exemplarily one millimeter thick. There are crystal growth techniques, like Vapor Phase Epitaxy, that offer fast growth of semiconductor layers, but these techniques are largely limited to growth of homogeneous layers like GaAs or InP. Rapid growth of short-period (several microns) superlattices required by Kastalsky et al. publication and patent is very difficult.

The short-period requirement in prior-art layered semiconductor scintillators results from the need to capture into the lower-gap wells most of the minority carriers generated in the wide-gap material. The present invention circumvents this requirement. As will be fully explained below, no travel of minority carriers is contemplated in the inventive structure. This is a radical departure from all prior art of scintillators endowed with special radiation sites that emit light at subband wavelengths. In all prior art scintillators, charge carriers were supposed to travel to these radiation sites and the distance to travel had to be minimized by increasing the concentration of radiation sites. Nevertheless, the finite travel distance leads to the above-mentioned non-proportionality of activated dielectric scintillators.

In the inventive structure, the minority carriers generated in the wide-gap material recombine there radiatively and the short-wavelength light thus generated is captured by the narrow-gap wells generating new minority carriers therein. Recombination of these new minority carriers in the narrow-gap wells generates longer wavelength scintillation, to which the entire layered structure is largely transparent. It is important that the separation between narrow-gap wells is no longer limited by the minority-carrier diffusion length and can be as large as hundreds of microns. The actual limitation on the well separation, according to the present invention, results from the need to capture most of the short-wavelength light by the narrow-gap wells. That in turn leads to an optimization strategy for the choice of the wide-gap host material and its doping. The primary requirement is high radiative efficiency of the host material. As will be fully explained below, the loss of short-wavelength light on the way to the narrow-gap wells is associated only with free-carrier absorption. The interband absorption of a photon merely generates a new minority carrier, which again recombines radiatively to produce another photon. The high radiative efficiency requirement ensures that non-radiative channels of recombination of minority carriers are minimized.

SUMMARY OF THE INVENTION

In the scintillator of the invention, the radiation sites are pumped by light and require no charge-carrier travel. An essential difference between the invention and the structure proposed by Kastalsky et al. and illustrated in FIG. 1 is that the separation between narrow-gap wells is much larger than the carrier diffusion length. Exemplarily, the wide-gap separation between narrow-gap wells is at least 100 μm. It is also essential that the width of the wells in the invention is more than 10 times larger than that disclosed by Kastalsky et al. Exemplarily, the well width in the device of the invention is at least 300 nm, preferably about 2 μm. The requirement of relatively large well width results from the need for efficient capture by the wells of light generated in the wide-gap material.

Figure 2:
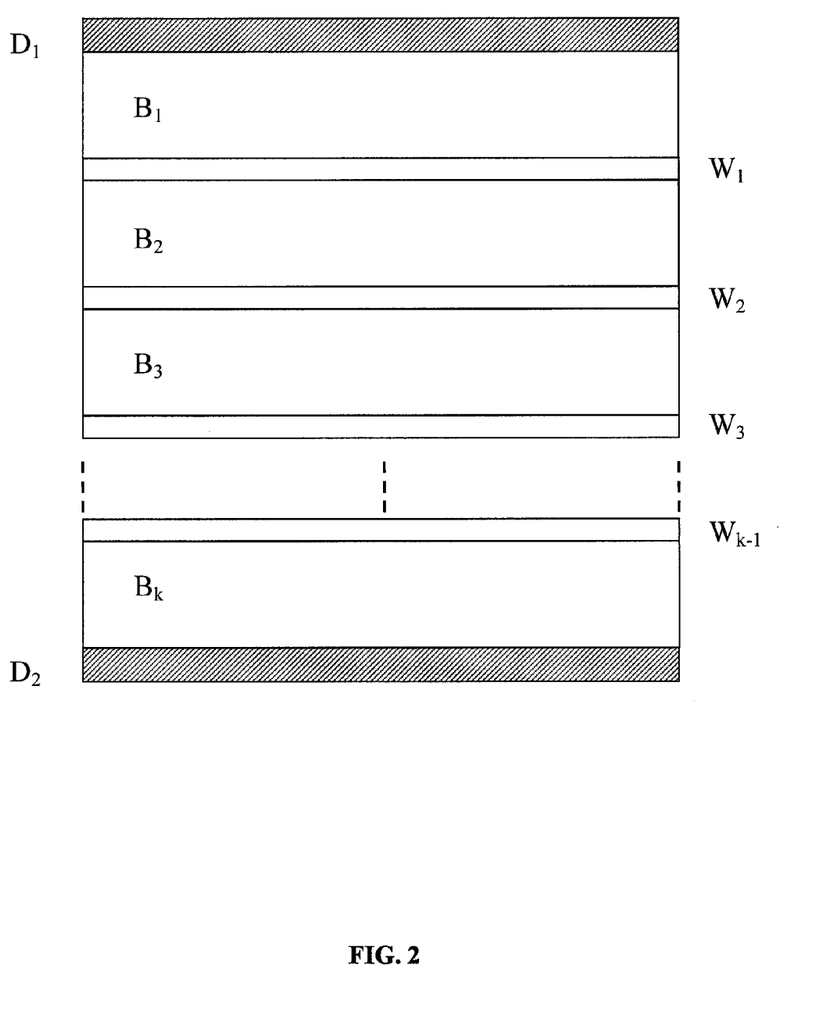
FIG. 2 is a schematic diagram illustrating the scintillator structure of the preferred embodiment of the invention.

An embodiment of the scintillator structure of the invention best illustrated in FIG. 2, represents a layered semiconductor heterostructure, comprising k units (exemplarily k=10), each unit of approximately 100 microns in thickness further comprising a thick wide-gap semiconductor region b (hereafter referred to as the barrier region) and a thin (typically, less than a micron) narrower-gap semiconductor region w (referred to as the well region). Exemplarily, b=100 μm and w=1 μm. Both the barrier and the well materials are direct-gap semiconductors with high radiative efficiency η, exemplarily the barriers are made of lightly-doped InP and the wells are made of lightly-doped ternary InGaAs or quaternary InGaAs alloys lattice-matched to InP. Both the barrier and well regions are typically doped with donors to concentration $N_D$ in the range between $10^{17}$ cm$^{-3}$ and $10^{18}$ cm$^{-3}$. This range of doping is chosen to maximize the radiative efficiency in recombination of minority carriers and minimize free-carrier absorption of scintillating radiation. The requirement of high-radiative efficiency η in the barrier layers is essential and we contemplate at least η>90%.

Because of the requirement b>>w, most of the interaction with incident high-energy radiation occurs in the barriers and results in the formation of a non-equilibrium population of minority carriers, exemplarily holes. The attendant increase in the population of majority carriers, exemplarily electrons, is of no particular importance, as their concentration may not appreciably vary from that provided by donors. Because of the high radiative efficiency, most of the minority carriers recombine radiatively and produce primary scintillating photons of energy $hv_b$ that is approximately equal to the bandgap $E_b$ in the barrier region. These primary photons may be further absorbed in the barrier layer. This absorption merely produces another minority carrier that in turn recombines predominately in a radiative fashion, generating another primary photon of energy $hv_b$. This process is referred to as the photon recycling. The loss of scintillating photons in the recycling process arises only due to two factors, namely the free-carrier absorption and the less than perfect radiative efficiency, η<100%. The need to optimize these two factors stems from the desire to minimize loss of the scintillation signal. Apart from the lost signal, the process of photon recycling in the barrier regions ends when the primary scintillating photon is absorbed in the well region.

Associated with the barrier material, is a quantity that has the dimension of length, which we shall refer to as the photon collection range R. This quantity depends primarily on the radiative efficiency of the barrier material and is defined as the maximum thickness b of a barrier layer, such that the collection efficiency ξ of the primary signal generated in said barrier layer in the two adjacent wells exceeds a desired value $ξ_{min}$, exemplarily 75%. The meaning of ξ is the probability that the process of photon recycling in the barrier region resulting from an initial minority carrier generated in said region ends with a primary scintillating photon absorbed in one of the two adjacent wells. The higher is the desired primary collection efficiency ξ, the shorter is the range R. The photon collection range R depends on the radiative efficiency η and the desired $ξ_{min}$; it sets an upper limit on the thickness of individual barriers. Thus, in the preferred embodiment of the invention, the thickness of barrier layers, while much larger than the diffusion length $L_D$ of minority carriers, is smaller than the photon collection range R, viz. $L_D$<<b<R. The range R is estimated by detailed calculations for exemplary structures and is typically several hundreds of microns. For example, if the radiative efficiency η=99% and the desired $ξ_{min}$=75%, then R≈0.5 mm.

The primary collection efficiency $ξ_{min}$ is not the only parameter that must be optimized to a desired value. In general, it is advantageous to minimize the dependence of ξ on the average position of the interaction within the barrier, i.e. on the center of the minority carrier cloud generated by gamma interaction. For this purpose, it is important to consider the typical size of this cloud, which we shall denote by R*. In first approximation, it is determined by the characteristic range of the plasmons, generated by the high-energy electron excited by the incident gamma photon. It is known, that the plasmon emission is the dominant energy loss mechanism for high-energy (higher than keV) electrons in semiconductors. This implies that the deposited energy of the gamma photon at an intermediate stage of the energy branching produces multiple plasmons of typical energy about 16 eV. These plasmons spread over the distance that is largely independent of the initial gamma energy and ultimately determines the radius R* of an approximately spherical minority-carrier cloud. It has been ascertained by calculations that the dependence of the primary collection efficiency $\zeta$ on the position of the center of this cloud is minimized when the thickness of the barrier layer b is larger than the radius R* of said cloud by about 40%. The typical value of R* is about 70 µm thus suggesting a preferred value of b≈100 µm, consistent with the range $L_D \ll b < R$, established above.

The requirement to well composition and thickness will be discussed now. The purpose of the wells is two-fold. Firstly, they must efficiently capture the primary scintillating photons and secondly, they serve as emitters of secondary scintillation photons at energy $h\nu_w$ that is approximately equal to the bandgap $E_w$ in the well region. For the purpose of efficient capture, the wells must be not too thin, exemplarily larger than 0.5 µm. The wells should be made of direct-gap semiconductor, lattice-matched and otherwise compatible with the barrier material, with the well bandgap $E_w$ narrower than the barrier bandgap $E_b$ by at least 50 meV. The condition $E_b$-$E_w$>50 meV guarantees not only the high absorption coefficient in the well for primary photons at energy $h\nu_b$, but it also ensures low absorption coefficient in the barrier for secondary scintillation photons at energy $h\nu_w$.

The secondary photons constitute the signal that is registered by the photoreceivers arranged at the surface of the entire scintillator structure in an optically tight fashion. In a preferred embodiment of the present invention, these photoreceivers are photodiodes sensitive to the secondary scintillation photons at energy $h\nu_w$ arranged on both sides of the layered scintillator structure. As initially disclosed by Abeles and Luryi, (see Slab Scintillator With Integrated Double-Sided Photoreceiver, PCT Application No PCT/US2010/01496), simultaneous detection and separate recording by both photoreceivers of the signal resulting from the same high-energy radiation event, enables one to adjust for the possible dependence of the total photon collection efficiency on the event position inside the scintillator and thus ensure higher energy resolution of the detector. This applies equally to the detector of the invention, as has been confirmed by detailed calculations.

DETAILED DESCRIPTION OF THE INVENTION

We are referring now to the drawings in general, and FIG. 2 in particular, illustrating the scintillator structure according to the preferred embodiment of the invention. The scintillator body comprises a sequence of k InP barrier layers $B_i$ (i=1, 2, ..., k) of thickness b in the range of 100 µM alternating with k-1 well layers $W_i$ (i=1, 2, ..., k-1) of thickness w in the range of 1 µm made of quaternary alloy InGaAsP that is lattice-matched to InP. Exemplarily, k is about 10, so there are altogether about 10 barriers and 9 wells. The alloy composition is chosen to produce the bandgap $E_w$=1.25 eV that is about 100 meV lower than $E_b$=1.35 eV of InP. The preferred embodiment includes photoreceivers $D_1$ positioned at top and $D_2$ positioned at bottom surfaces of the scintillator body. The photoreceivers are sensitive to the luminescence produced by the recombination of minority carriers in the well material and implemented on both the top and the bottom surfaces of the scintillator body in an optically tight fashion. Exemplarily, the photoreceivers represent epitaxially grown quaternary InGaAsP PIN diodes with a still lower bandgap $E_d$=1.20 eV, as compared to the well material; typically, the diode bandgap $E_d$ should be at least 50 meV lower than $E_w$. Means are provided to record the response of the top and the bottom photoreceivers individually and separately.

Detailed model calculations for a preferred embodiment illustrated in FIG. 2 have been carried out. The scintillator body comprises a sequence of k=10 InP barrier layers of thickness 100 µm alternating with well layers of thickness 1 µm made of quaternary alloy $In_xGa_{1-x}As_yP_{1-y}$ that is lattice-matched to InP. Lattice matching requires x=0.454 y and the resultant bandgap is given by $E_G$ (y)=1.35−0.72 y+0.12 $y^2$. The alloy composition (x=0.06 and y=0.14) is chosen to produce the bandgap $E_w$=1.25 eV that is about 100 meV lower than $E_b$=1.35 eV of InP. The preferred embodiment includes photoreceivers implemented on both the top and the bottom surfaces of the scintillator body in an optically tight fashion. Exemplarily, the photoreceivers represent epitaxially grown PIN diodes implemented in a quaternary lattice-matched to InP alloy $In_xGa_{1-x}As_yP_{1-y}$ These photodiodes must be sensitive to the luminescence produced by the recombination of minority carriers in the well material. For this purpose, the diode bandgap must be lower than that of the well material, viz. $E_d<E_w$. Exemplarily, E=1.20 eV, which is 50 meV less than the chosen $E_w$ have been chosen. This value of $E_d$ is achieved with the quaternary lattice-matched to InP alloy $In_xGa_{1-x}As_yP_{1-y}$ for x=0.09 and y=0.21.

Arrangements are provided to record the response of the top $D_1$ and the bottom $D_2$ photoreceivers individually and separately. It is essential that for a given energy deposition by a single high-energy particle, we have two signals $D_1$ and $D_2$ in the top and the bottom photodiodes, respectively. These signals in general depend on the position z of the interaction with the high-energy particle. The sum of the two diode signals $D_1(z)+D_2(z)$ (per unit excitation) is referred to as the total photon collection efficiency, or the PCE. In general, the PCE is still dependent on the position z owing to possible optical attenuation of the signal. This dependence is taken into account in a scintillator system that aims at a high resolution of the deposited energy. In a preferred embodiment of the measurement system, the two signals $D_1$ and $D_2$ are further analyzed by computing the ratio D of their difference and their sum, viz.

$$D(z) = \frac{D_1(z) - D_2(z)}{D_1(z) + D_2(z)} \tag{1}$$

The ratio D (z) varies in the range between −1 and +1, and it vanishes in the middle of the structure, at z=d/2, where $D_1=D_2$ by symmetry. The ratio D computed for a particular interaction can hence be used to ascertain its position z and thus correct for possible attenuation of the signal.

The scintillator performance of the invention is analyzed below by theoretical calculations, using the physical model, discussed above. Although the possible use of our scintillator is contemplated for a variety of high-energy radiation sources, the discussion presented herein below is confined to gamma spectroscopy. Interaction with a single gamma photon, which is either Compton scattering or photoelectric absorption, results in a large amount of energy $E_0$ that is typically of order 100 keV, deposited (i.e. transferred to an electron) at a position z. The high-energy electron, initially excited by the gamma interaction, gives away its energy in a cascade process that ends up with a number N of thermalized electron-hole pairs. The average energy per pair $E_i=E_0/N$ is a characteristic of the material, called the ionization energy. In InP the average ionization energy is approximately $E_i$=4.2 eV. One of the purposes of the scintillator of the invention is to perform gamma spectroscopy, that is to quantify the deposited energy $E_0$ by measuring N via the optical signals $D_1$ and $D_2$.

In order to conduct a quantitative analysis, it is necessary to specify the physical model further. Inasmuch as our scintillator body is an n-type semiconductor, the number of majority carriers (electrons) does not appreciably change as a result of a single gamma interaction, hence without any loss of generality we can regard the number N as the number of generated minority carriers (holes). The cascade energy branching process occurs at a much faster scale (picoseconds) than the recombination of minority carriers (nanoseconds). At the end of the cascade process, but before an appreciable recombination has taken place, there are N holes distributed in some region of the semiconductor, referred to as the minority-carrier (hole) cloud.

In the model calculations this region was considered to be substantially spherical and centered about the initial gamma interaction position. The radius R of the hole cloud is taken independent of the deposited energy $E_0$. This assumption is reasonable when the dominant energy loss mechanism is plasmon emission. In this case, for any $E_0$>>1 keV, the intermediate stage of the energy branching comprises multiple plasmons of typical energy about 16 eV that spread over the distance largely independent of $E_0$.

Figure 3:
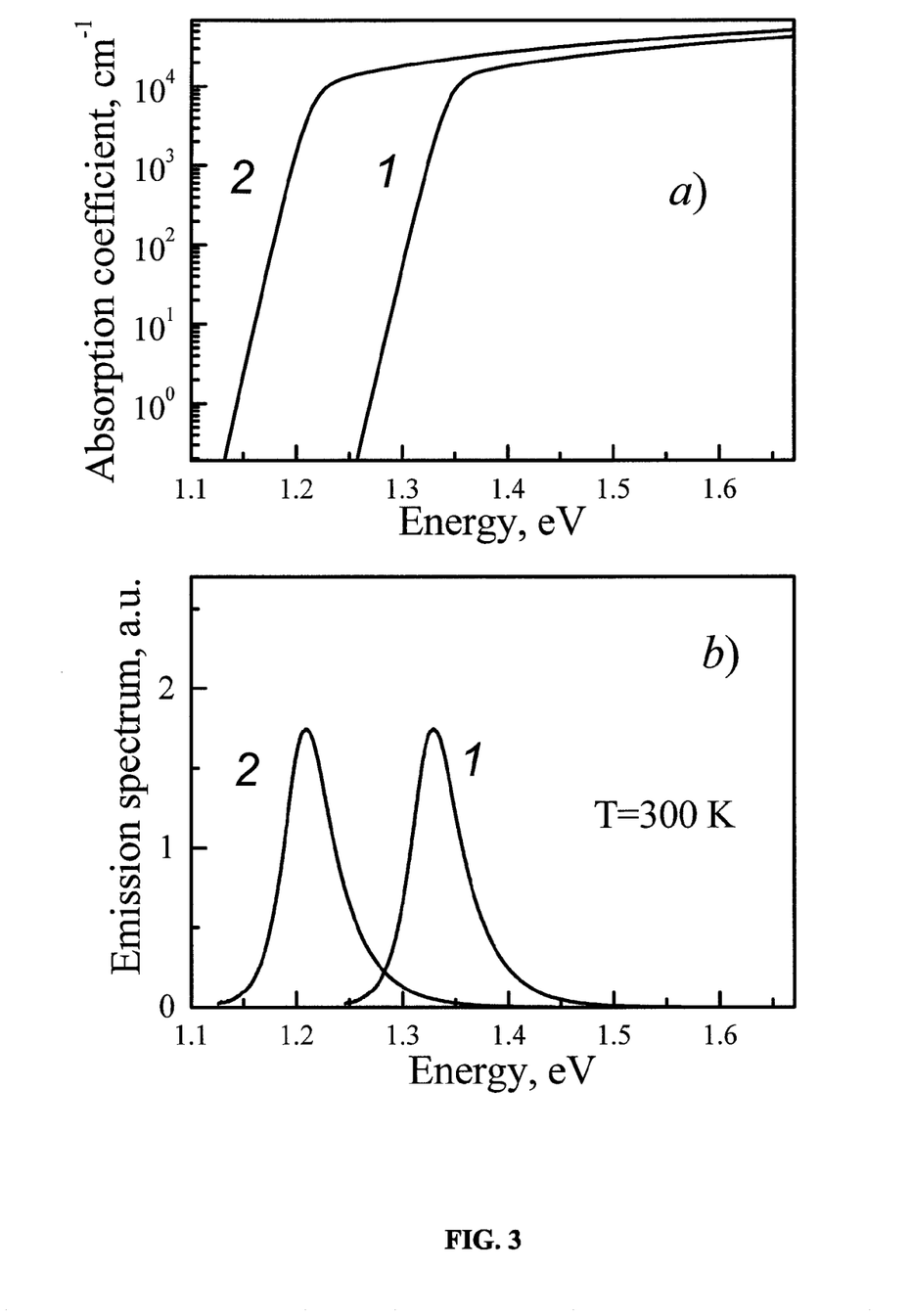
FIG. 3 shows the diagrams illustrating the absorption and the emission spectra in the barrier and well materials.

We are referring now to FIG. 3 illustrating the absorption and the emission spectra in the barrier and well materials. Curves 1, corresponding to the barrier material, are experimental curves for lightly n-type doped InP (doped with sulfur, $3\times10^{17}$ cm$^{-3}$) and curves 2 describe similarly doped lattice-matched InGaAsP alloy of bandgap $E_w$=1.25 eV.

The radiative properties of semiconductors employed in the barrier and well layers, as illustrated in FIG. 3, will be described in terms of their emission and absorption spectra. These spectra are similar in both materials but are shifted relative to one another by the bandgap difference. In each material, the peak of the emission spectrum is in the region of strong self-absorption, so that the material is transparent only to the long wavelength wing of its own emission spectrum. An important observation is that the entire emission spectrum of the wide bandgap barrier layer is in the region of strong absorption in the wells and that the entire emission spectrum of the narrow-bandgap well layer is in the region of transparency of the barrier material. These two observations can be regarded as the defining properties of the inventive scintillator. They lead directly to the two-step scintillation process, whereby most of the primary luminescence generated in the barriers is absorbed in the nearby wells, resulting in the secondary luminescence at longer wavelengths. That secondary luminescence has a high probability of reaching the surface of the layered structure, giving rise to photoreceiver signals, because most of the structure volume is made of the barrier material, largely transparent to secondary luminescence.

Transport of the luminescent photons, both primary and secondary, across the material will be discussed in terms of the so-called on-the-spot approximation and used by the inventors to extract important parameters of InP. This model neglects entirely the diffusion of minority carriers and describes the transport of photons, as mediated by photon recycling, in terms of repeated emissions from the same spot.

The essential material parameters that limit photon recycling are the free-carrier absorption (FCA) characterized by an absorption coefficient $\alpha_{FCA}$ and the radiative efficiency η defined in terms of the minority-carrier recombination times, radiative ($\tau_r$) and nonradiative ($\tau_{nr}$), or more precisely in terms of their ratio $r=\tau_r/\tau_{nr}$, viz.

$$\eta = \frac{\tau_{nr}}{\tau_r + \tau_{nr}} = \frac{1}{1+r} \tag{2}$$

The first step in the analysis is to consider the collection efficiency ζ of primary photons, defined as the probability that luminescence generated in the barrier by the recombination of an initial hole at some position z ends up being absorbed in one of the nearest wells. This probability is much larger than the probability that a typical primary photon (average over the emission spectrum) reaches one of the wells on the first try. That probability we refer to as the one-shot probability, and designate by small letters $p_1$ (z) and $p_2$ (z)=$p_1$ (b−z) for the two nearest wells. In terms of these one-shot probabilities, the primary collection efficiency is given by $$\xi(z) = \frac{p_1(z) + p_2(z)}{p_1(z) + p_2(z) + p_{FCA} + r} \tag{3}$$

where $p_{FCA}$ is the single-shot probability that an emitted photon will lost to free-carrier absorption. The range R, such that for z<R one has $\xi(z)<\xi_{min}$ for some $\xi_{min}$, is referred to as the photon collection range. The larger is the desired $\xi_{min}$ the more restricted is the photon collection range R. The photon collection range R depends on the radiative efficiency η and sets an upper limit on the thickness of individual barriers.

Figure 4:
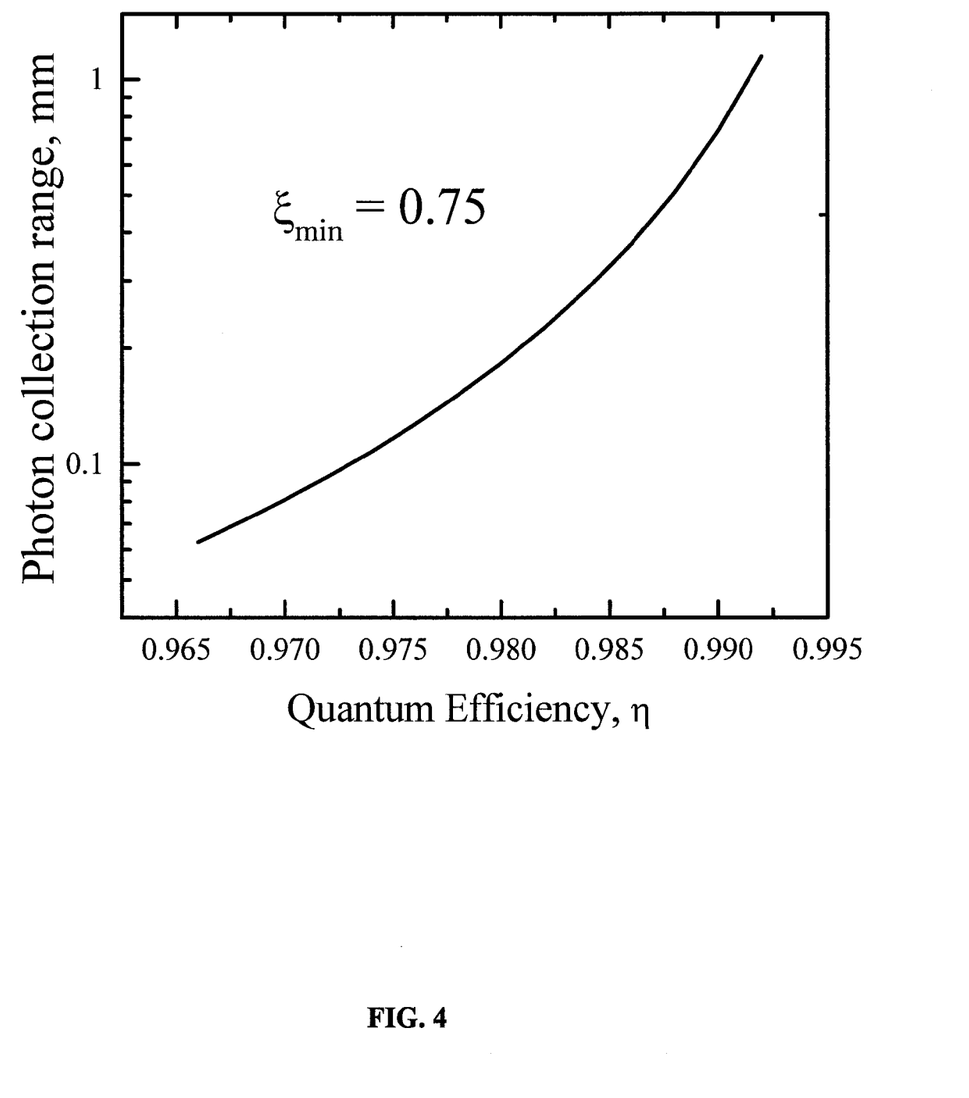
FIG. 4 is a diagram illustrating the photon collection range R calculated for a given desired photon collection efficiency.

We are referring now to FIG. 4 which illustrates the photon collection range R calculated for a given desired photon collection efficiency; by the nearest wells, $\xi_{min}$=0.75, as a function of the quantum efficiency of photon emission. FIG. 4 actually shows the calculated range R as a function of the assumed quantum radiative efficiency η in the barrier material for an exemplary desired primary collection efficiency of 75%, i.e., $\xi_{min}=0.75$.

In this calculation, the one-shot probabilities $p_1$, $p_2$ and $p_{FCA}$ were calculated using the experimental data for the absorption and the emission spectra, illustrated in FIG. 3. The main feature of the z dependence of $p_1$ and $p_2$ is that it is a power law, rather than an exponential, $p_1(z) \sim 1/z^\xi$, except at very long distances, where the dependence becomes exponential due to free-carrier absorption. The theoretical value of the exponent ζ is $\zeta = 1 - \Delta/kT \approx 0.4$ for low-doped n-type InP at room temperature, where $\Delta \approx 10$ meV is the Urbach tailing parameter for absorption spectra.[9] Empirically, one can approximate the dependence $p_1(z)$ very accurately by an expression of the form, $$p_1(z) = \frac{0.5 \times \exp(-\alpha_{FCA} z)}{(1+z/z_1)^{\zeta_1} \times (1+z/z_2)^{\zeta_2}} \quad (4)$$

where for lightly-doped InP ($N_D = 3 \times 10^{17}$ cm$^{-3}$) one has $z_1 = 0.09$ μm, $z_2 = 0.82$ μm, $\zeta_1 = 0.2$, and $\zeta_2 = 0.23$. The free-carrier absorption for this concentration is practically negligible ($\alpha_{FCA} \approx 0.1$ cm$^{-1}$).

To estimate the actual value of the radiative efficiency η, the experimental data of the Semyonov, Subashiev et al. publication was used for the recombination rates in InP, as function of the free-carrier concentration n at room temperature, $\tau_r^{-1} = 1.2 \times 10^{-10}$ n and $\tau_{nr}^{-1} = 0.4 \times 10^{-6} + 1.5 \times 10^{-30}$ n$^2$ (both in units of s$^{-1}$).

For the low-doped InP, the radiative efficiency η>0.99, so that r=(1−η)/η≤0.01. As seen from FIG. 4, for such high efficiencies and assuming the desired primary collection efficiency $\xi_{min}=0.75$, the photon collection range R{$\xi_{min}=0.75$}>0.7 mm. In the preferred embodiment of the scintillator structure of the inventions best illustrated in FIG. 2, the distance between wells b=0.1 mm is much shorter than this range. Conversely, it is possible to estimate the minimum primary collection efficiency for a given barrier thickness, using Eq. (3). Let us estimate the minimum primary collection efficiency for exemplary b=100 μm Minimum collection occurs when the interaction is in the middle of the barrier, z=b/2=50 μm, when $p_1 = p_2 \approx 5.5 \times 10^{-2}$ by Eq. (4). In this case, Eq. (3) gives $\xi_{min} = (b/2) \approx 0.92$.

Since $\xi(z) \geq \xi_{min}$, the primary collection efficiency will be still higher, when z is not in the middle of the barrier. This dependence of ξ(z) on the position of the interaction within a barrier is inherited by the ultimate PCE, as received by the surface photodiodes, and gives rise to an unwelcome phenomenon of "wiggles" in the dependence of the PCE on the fine-grained position of the interaction within a barrier. These wiggles will be discussed further below in this application. At this point, it is merely noted that the wiggle amplitude can be minimized by a judicial choice of the barrier thickness.

The point-like excitations, neglecting the spatial dimensions of the excited minority-carrier cloud have been considered above. Taking into account the finite size of the cloud, comparable to the barrier thickness, will have a quantitative effect on the results. The most important effect of the extended cloud is that it reduces the wiggle amplitude, compared to the point-like excitation. These effects are estimated in a model, where the excited holes are distributed homogeneously within a sphere of radius R*, i.e. $\rho(\vec{r}) = 3/4\pi R^{*3}$ for $|\vec{r}| \leq R^*$ and zero otherwise. In order to obtain the z dependence of the distribution, we integrate over the plane parallel to the scintillator layers. This gives $$\rho(z) = \frac{3}{4R^*}\left[1 - \left(\frac{z}{R^*}\right)^2\right] \quad (5)$$

The problem can be solved by using a kinetic equation. In a reasonably accurate simplified approach we can take into account the effect of the extended cloud by averaging the one-shot probabilities $p_1$, $p_2$ and $p_{FCA}$ in Eqs. (3) and (4) over the distribution (5).

The first stage of luminescence collection was described in the scintillator of the invention corresponding to the collection of primary scintillating photons generated in a barrier by the adjacent wells. Absorption of primary photons in the wells results in the generation of minority carriers in the wells, their number related to the initial number of holes generated by the gamma interaction by the function ξ(z) given by Eq. (3).

In the next stage, these minority carriers recombine in the wells, producing the longer wavelength radiation comprising secondary scintillation photons at energy $h\nu_w$ that is approximately equal to the bandgap $E_w$ in the well region. The secondary photons are eventually absorbed in the surface photoreceivers, producing the signals $D_1$ and $D_2$. Inasmuch as the barrier material is substantially transparent to this radiation, the transport of secondary photons to the surface represents a sequence of random hops between different wells. Evaluation of the signals $D_1$ and $D_2$ becomes a discrete version of similar calculations for the homogeneous scintillator outlined in the Luryi and Subashiev publication.

Figure 5:
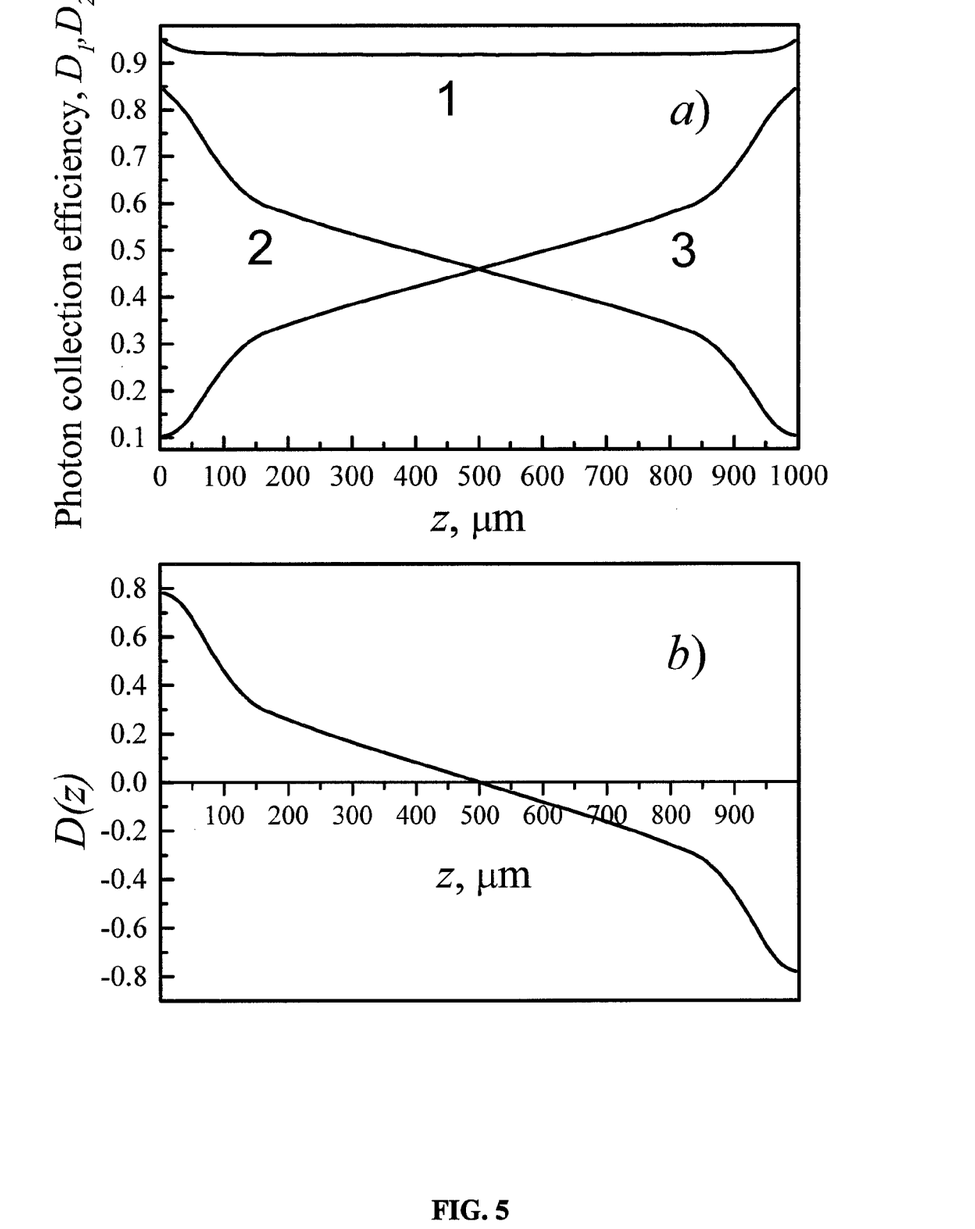
FIG. 5 shows the diagrams illustrating the calculated detection parameters.

We are referring now to FIG. 5 which illustrates the calculated detection parameters for an exemplary 1 mm-thick structure with 10 barriers (b=100 μm) and 9 wells (w=1 μm), assuming the quantum efficiency of 99% and the particle cloud radius R*=70 μm. In FIG. 5 the diagram (a) shows the photon collection efficiency (PCE, 1) and the signals $D_1(z)$ and $D_2(z)$ of the front and the back photodiodes (curves 2 and 3, respectively) as functions of the distance z of the radiation event from the structure edge. The diagram (b) shows the function D(z) that enables one to ascertain the interaction position z and adjust for possible attenuation of the signal; this function is defined by Eq. (1).

FIG. 5 actually shows the calculated values of the signals $D_1$ and $D_2$, normalized per unit excitation. This normalization means that the overall PCE is given by the sum $D_1+D_2$. The calculated PCE would reduce to the collection efficiency of primary photons ξ(z) if the transport of secondary photons were completely lossless. The nature of photon loss is characteristic of the photon-recycling regime, now applied to secondary photons hopping from well to well. When a secondary photon is absorbed in a well, it is re-generated in a random direction with the probability given by the radiative efficiency $\eta_w$ in the well. In the calculations it is assumed that the same value holds for the radiative efficiency in both the well and the barrier material, $\eta_w = \eta_b = \eta$, although this need not be the case in general. The less than perfect radiative efficiency, $\eta_w < 100\%$ results in incomplete re-generation of secondary photons in the hopping transport through the wells. Another source of loss of secondary photons results from free-carrier absorption. The entire structure, including the barriers, contributes to this loss, but in low-doped InP it is still relatively small.

The diagram (a) of FIG. 5 shows the calculated PCE (curve 1), its component signals $D_1$ and $D_2$ (curves 2 and 3, respectively). The photo-diodes themselves are assumed ideally absorbing and this assumption is responsible for the calculated behavior of the PCE near the structure surfaces, when the absorption occurs in the vicinity of one of the photodiodes. Apart from these side effects, the PCE is reasonably flat, which is advantageous for energy resolution. In the exemplary calculation of FIG. 5, it was used the value 99% for the radiative efficiency $\eta_w=\eta_b=\eta$. The flat value of PCE is reasonably close to the minimum the collection efficiency of primary photons $\xi(z)=92\%$, which indicates that loss of secondary photons is very small. This is obviously due to the high value of $\eta_w$.

Nevertheless, any positional dependence of the PCE is unwelcome, since it makes the determination of deposited energy uncertain. As disclosed by the Abeles and Luryi PCT patent publication, one can remedy this problem if one knows the position of the interaction. In this case, the measured value of the PCE can be adjusted. The diagram (b) of FIG. 5 shows the preferred distance discriminating function D (z) defined by Eq. (1). In order to be able to form such a function it is essential that signals $D_1$ and $D_2$ are measured individually. The function D (z) resolves the vertical position of the interaction and thus improves the energy resolution of the scintillator by allowing the operator to adjust for the position dependence of the PCE. Furthermore, this function can be helpful in matrix applications, when the scintillator of the invention is used as one pixel of a three-dimensionally pixellated system, sometimes called the Compton camera or the Compton telescope. Improved resolution of the vertical position within a pixel is an important property that allows one to have thick pixels without sacrificing spatial resolution. Furthermore, with the assistance of a discriminating function like D (z) one can replace a three-dimensionally pixellated system by a two-dimensional array of thick pixels, where the distance-discriminating power of D (z) is used instead of the pixel position to ascertain the z-coordinate of the interaction.

It was previously mentioned that the PCE dependence on z can show wiggles on the fine scale, said wiggles originating from the dependence of the primary collection efficiency $\xi(z)$ on the position of the interaction within the unit element of the structure. If the distribution of the minority carriers generated by a single interaction were point-like, then minima of $\xi(z)$ would occur in the middle of barriers, $\xi_{min}=(b/2)$. For an extended cloud, there will remain in general some dependence of $\xi(z)$ on the cloud position, but the minima may not necessarily occur when the cloud center is in the middle of a barrier.

Figure 6:
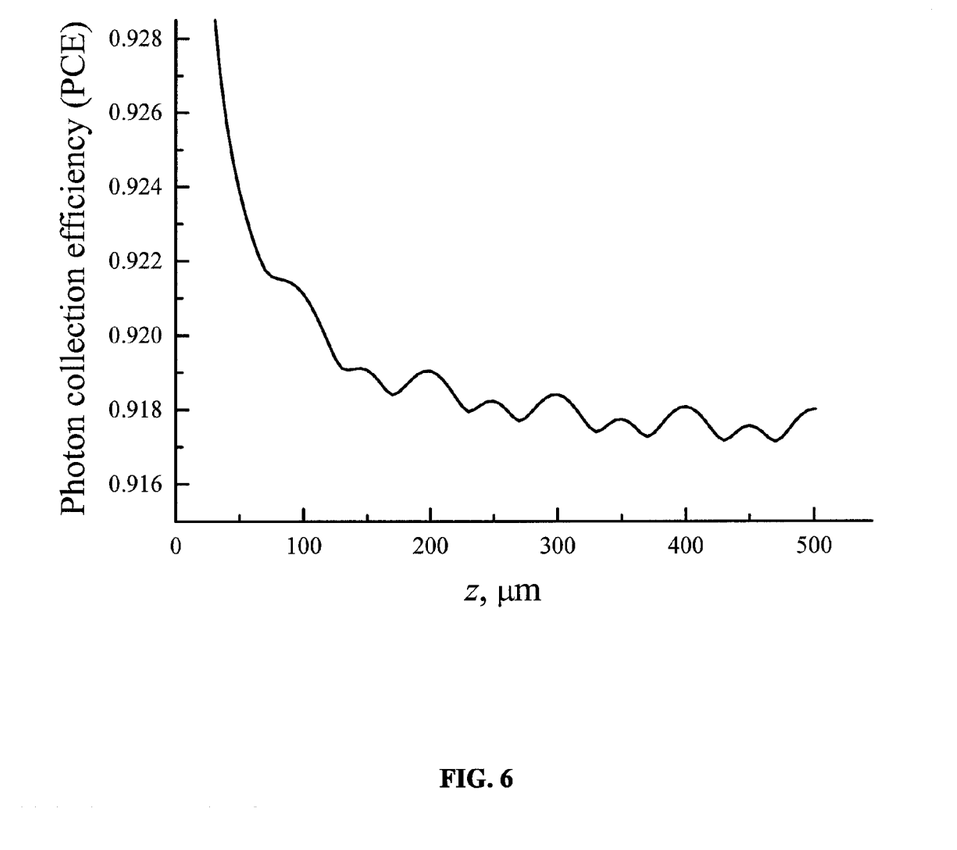
FIG. 6 is a diagram showing the photon collection efficiency for the structure shown in FIG. 5 in a large scale.

We are referring now to FIG. 6 showing the photon collection efficiency for the structure shown in FIG. 5 in large scale, revealing the wiggles in PCE with an amplitude below 0.2%. The minimum PCE in the center of the structure is above 91%. FIG. 6 illustrates on the magnified scale the positional dependence of the PCE for the same structure parameters as in FIG. 5. The wiggles in the PCE are clearly displayed, their magnitude being relatively low, about 0.2%. The possibility of optimizing the structure from the standpoint of minimizing the wiggle amplitude was examined. According to the examination, such optimization is possible by selecting a suitable barrier width b to be about 40% larger than the radius R* of the extended minority-carrier cloud.

The value of R* is an important physical parameter that is determined by the initial high-energy processes at the early stages of energy-branching cascade. Inasmuch as the dominant interaction of high-energy electrons in semiconductors is plasmon emission, the radius R* is substantially independent of the energy transferred by the incident quantum to the electronic system and is controlled by the distance over which plasmon spread over. The estimated value of R* in InP is about 70 µM, but this value should not be considered definitive; in practice, one may be able to assess the value of R* from experimental date for a given semiconductor From the analysis of basic equations, it is clear that the wiggle amplitude is a function of the ratio b/R* and therefore we have conveniently evaluated this amplitude by varying R* for a given b, rather than varying b for a given R*.

Figure 7:
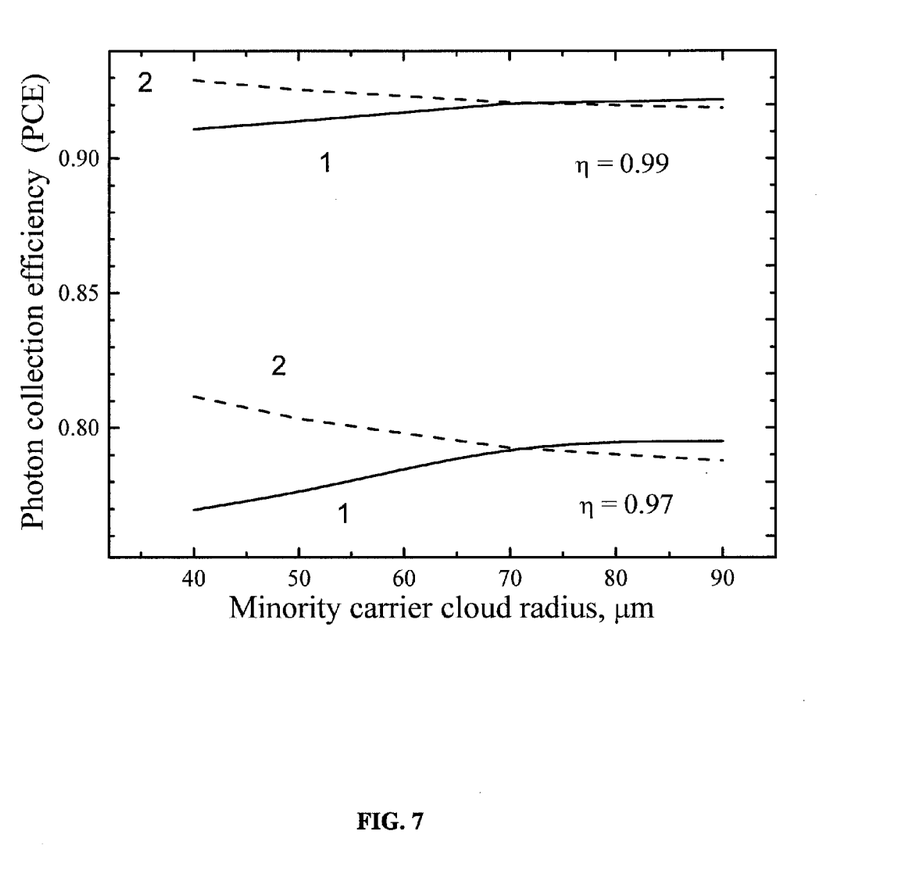
FIG. 7 is the diagram illustrating the principle of optimizing the width of the barrier.

We are referring now to FIG. 7 which illustrates the principle of optimizing the width of the barrier, taking into account the minority-carrier cloud radius R*, in order to minimize the amplitude of wiggles in the photon collection efficiency. The calculation describes a particular wiggle in the PCE curve and shows the minimum value (curves 1, corresponding to the excitation event occurring at z≈450 µm or z≈550 µm, i.e. in the center of one of the two central barriers in a 10-barrier structure) and the maximum value (curves 2, corresponding to the excitation event events occurring at z≈500 µm, i.e. in the center of the entire multilayered structure, which in the exemplary 10-barrier and 9-well structure coincides with the position of the 5-th well)—both as functions of the assumed radius R* of the excited hole cloud in a structure with fixed barrier width b=100 µm. Calculations are presented for two exemplary values of the quantum efficiency, 99% and 97%. In both cases, the wiggle amplitude is minimized when R*=0.7 b. For the optimized structure the wiggles are negligible.

FIG. 7 illustrates the result of the calculations. The wiggle amplitude is characterized by plotting the PCE evaluated for two interaction positions. Curves (1) of FIG. 7 correspond to an event occurring at z≈450 µm or z≈550 µm, i.e. in the center of one of the two central barriers. On the other hand, curves (2) of FIG. 7 illustrates events occurring at z≈500 µm, i.e. in the center of the entire multilayered structure, which coincides with the position of the 5-th well.

There are actually two sets of curves provided in FIG. 7, the two upper curves corresponding to the structure parameters as in FIG. 5, where the radiative quantum efficiency was assumed to be 99%, i.e. 77=0.99. The two lower curves correspond to the same structure but with the assumed lower quantum efficiency $\eta_w=\eta_b=\eta=0.97$.

Figure 8:
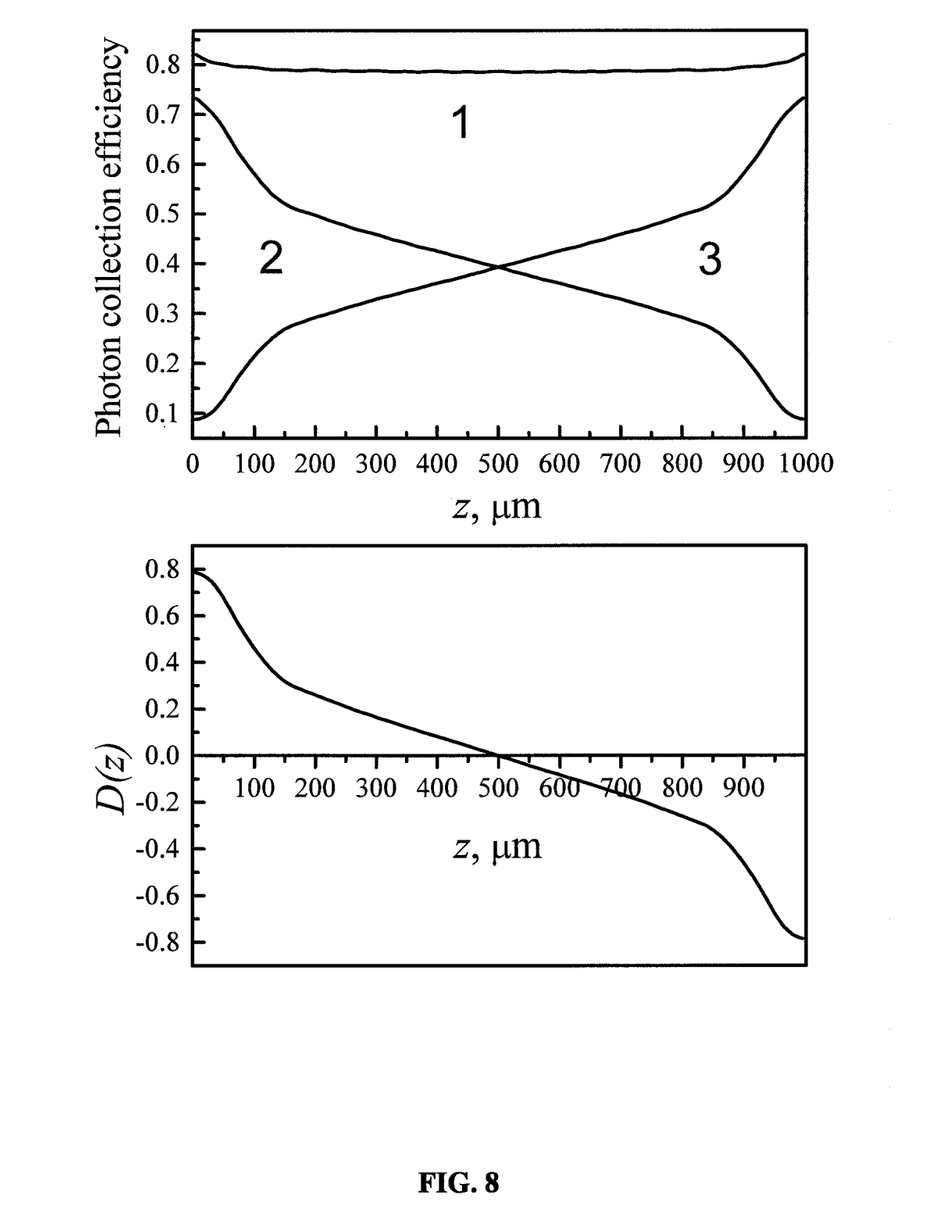
FIG. 8 shows the diagrams which demonstrate the importance of high quantum efficiency.

We are referring now to FIG. 8 demonstrating the importance of high quantum efficiency. This figure shows the detection parameters calculated for the structure similar to that in FIG. 5 in all respects, except that the quantum efficiency is now assumed to be 97%.

Curves similar to those in FIG. 5 for a structure with the same parameters except for the lower radiative efficiency of 97% are shown in FIG. 8, which illustrates the importance of high radiative efficiency for the overall level of the PCE. The two sets of curves in FIG. 7, those for $\eta=0.99$ and $\eta=0.97$ are quite similar in their dependence on the ball radius, but it is notable that the lower efficiency degrades not only the overall magnitude of the PCE but it also makes the wiggle amplitude higher. The importance of high radiative efficiency is essential for performance of the inventive scintillator.

Both sets of curves in FIG. 7 clearly show that for small values of R*, the PCE is lower when the cloud center is in the middle of a barrier, whereas for large R*, the lower PCE corresponds to the interaction centered in the middle of a well. The wiggle amplitude is minimized for R*≈0.7 b, which gives a strategy for optimizing the barrier width. This strategy must also take into account the possible costs associated with growing multiple periods of the structure. Thus, the possible implementation of the structure by a combination of HVPE (hydride vapor phase epitaxy) and MOCVD (metalorganic chemical vapor deposition) growth techniques is contemplated, whereby the thick barriers are grown by HYPE and thin wells by MOCVD. In this case, for a given thickness of the overall structure, say, one or several millimeters, one would like to minimize fabrication costs involved in the transfer of wafers between the different epitaxy setups. To minimize these costs, the individual barrier thickness b should be as high as possible, so long as it is consistent with the optimum performance. The calculations presented in FIG. 7 show that when b substantially exceeds the size of the minority carrier cloud, the performance begins to degrade in terms of increasing wiggle amplitude.

This consideration assumes that the precision of our measuring the signals $D_1$ and $D_2$ is insufficient for the function D (z) to discriminate the position within a single barrier. If the photodiode signals are measured sufficiently accurately, then the event position is also accurately known, enabling one to correct for the wiggles as well as for the overall position dependence of the PCE. In this case, one would be justified in growing thicker barriers.

The exemplary discussion is confined to the specific and preferred material system of lattice-matched InP and quaternary InGaAsP semiconductors. These direct-gap semiconductors are known to possess high radiative efficiency and at the same time produce scintillation at sufficiently short wavelengths (hv ≥1 eV) that the entire detector system can operate at room temperature. If one contemplates cooled operation of the inventive detector, the scope of possible semiconductor materials widens to include narrow bandgap systems, including those based on InAs, GaSb, and their alloys. Those skilled in the art will recognize multiple possibilities, limited primarily by the availability of rapid growth techniques.

A number of possibilities remain even if the contemplated operation is restricted to room temperature. Again, these possibilities are limited primarily by the availability of rapid growth techniques and are well-known to those skilled in the art. Instead of producing an exhaustive list, we mention one possibility here. The well material is GaAs and the barrier material (wide-gap) is AlGaAs with the aluminum content such that the alloy has direct bandgap, exceeding that of GaAs by at least 100 meV. The advantage of the GaAs/AlGaAs system is that one can contemplate growth of the entire heterostructure in the same growth chamber, including rapid growth of the barrier material with the wells produced by periodic cutting off the source of aluminum.

Figure 9:
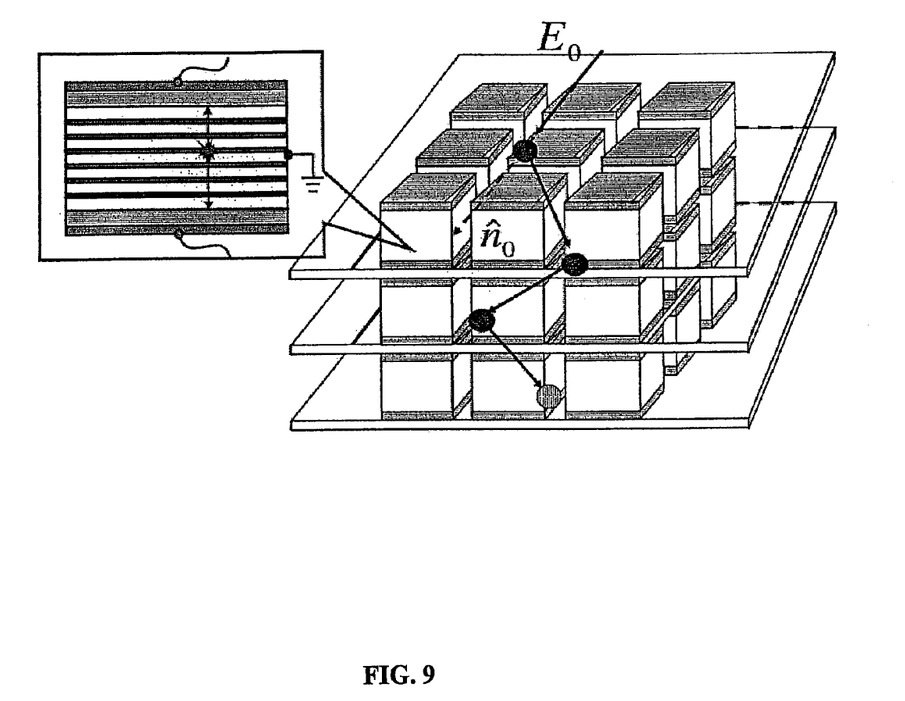
FIG. 9 illustrates the integration of an array of layered semiconductor scintillators forming a three-dimensionally (3D) pixellated photoreceiving system.

The reference is made now to FIG. 9 which illustrates integration of an array of layered semiconductor scintillators forming a three-dimensional (3D) pixellated photoreceiving system. In the three-dimensional array formed by the integrated individual layered scintillators of the invention, it is contemplated that a plurality of scintillator slabs are implemented in separate semiconductor wafers. Each scintillator is provided with a two-dimensional (2D) pixellated system comprising as elements the inventive layered scintillators. A stack of such slabs is a 3D pixellated array of unit volume pixels that are referred to as voxels. With sufficient number of slabs in the stack, it can accommodate any absorption length of high-energy radiation. In response to an incident gamma-photon of the initial energy $E_0$ and the direction characterized by unit vector $\hat{n}_0$, several voxels will fire and return to the central processing units the energy deposited in each of said firing voxels and their position in the array. This information can be used to determine both $E_0$ and $\hat{n}_0$. The information about each ionizing radiation event is contained in the simultaneous response from several voxels and enables high-resolution angular discrimination. The angular information resides in the anisotropy of Compton scattering. This information can be extracted based on the 3D pixellation. At the same time, the simultaneous signal registration by several voxels allows a direct measurement of the incident photon energy.

We claim:

1. A scintillator detector of high-energy radiation generating scintillation light in response to an ionization event resulted from interaction by a high energy particle, said scintillator detector comprising:
    a semiconductor slab having alternating layers of barrier and well material, said barrier and well material layers are direct bandgap semiconductors with high radiative efficiency of minority carriers;
    a bandgap of said well material is smaller than a bandgap of said barrier material so that the barrier layers are substantially transparent to photons produced by carrier recombination in the well material;
    combined thickness of the well layers being substantially smaller than a total thickness of said semiconductor slab;
    thickness of the barrier layers being substantially greater than a diffusion length of the minority carriers; and
    thickness of the well layers being sufficiently large to absorb most of incident scintillating radiation generated in the barrier layers in response to the ionization event resulted from interaction by the incident high-energy particle.

2. A scintillator detector of claim 1, further comprising multiple photoreceiver arrangements for detecting photons produced by carrier recombination in the well material, said photoreceiver arrangements generating response signals capable of quantifying a number of detected photons.

3. A scintillator detector of claim 2, further comprising an arrangement for analyzing the individual signals generated by said multiple photoreceiver arrangements, said analyzing arrangement adapted for extracting a position of said ionization event within said semiconductor slab.

4. A scintillator detector of claim 3, wherein operation of said analyzing arrangement is based on pre-calculated functional dependence of a signal attenuation of said ionization event relative to each of said multiple photoreceiver arrangements.

5. A scintillator detector of claim 2, said semiconductor slab formed having top and bottom surfaces, wherein said multiple photoreceiver arrangements are disposed on said top and bottom surfaces of the semiconductor slab in an optically tight fashion.

6. A scintillator detector of claim 2, wherein operation of said photoreceiver arrangements is faster than a rate of said ionization events within the scintillator slab material.

7. A scintillator detector of claim 2, wherein the thickness of individual barrier layers is chosen to minimize wiggles in the photoreceiver response as function of the position of said ionization event.

8. A scintillator detector of claim 1, wherein the barrier material is InP and the well material is quaternary InGaAsP alloy.

9. A scintillator detector of claim 8, wherein the quaternary InGaAsP alloy is lattice-matched to InP with a bandgap at least 50 meV narrower than the bandgap of InP.

10. A scintillator detector of claim 8, wherein high radiative efficiency of barrier and well layers is achieved by lightly doping said layers.

11. A scintillator detector of claim 1, wherein the well material is GaAs and the barrier material is AlGaAs alloy.

12. A scintillator of claim 1, wherein the barrier material and the well materials are made of AlGaAs alloys having various aluminum content.

13. A scintillator detector of claim 1, wherein the thickness of individual barrier layers is chosen relative to a size of a minority carrier cloud generated in a single ionization event.

14. A scintillator detector of claim 1, wherein the combined thickness of all said well layers is less than 10% of the total thickness of the slab.

15. An article comprising an array of individual pixels, each said pixel comprising a semiconductor scintillator formed as a scintillator slab generating scintillation light in response to an ionization event resulted from interaction by a high energy particle, said article comprising:

multiple scintillator slabs each having alternating layers of barrier and well material;
  in each said slab the alternative layers of barrier and well material layers are direct bandgap semiconductors with high radiative efficiency of minority carriers;
  in each said slab a bandgap of said well material is smaller than a bandgap of said barrier material so that the barrier layers are substantially transparent to photons produced by carrier recombination in the well material;
  in each said slab combined thickness of the well layers being substantially smaller than a total thickness of said semiconductor slab;
  in each said slab thickness of the barrier layers being substantially greater than a diffusion length of the minority carriers; and
  in each said slab thickness of the well layers being sufficiently large to absorb most of incident scintillating radiation generated in the barrier layers in response to the ionization event resulted from interaction by the incident high-energy particle.

16. An article of claim 15, wherein said array of individual pixel is a three-dimensional array.

17. An article of claim 15, further comprising a plurality of semiconductor wafers, each said semiconductor wafer accommodating said multiple scintillator slabs.

18. An article of claim 17, wherein each said semiconductor wafer forms a two-dimensional pixellated system.

19. An article of claim 15, wherein each said scintillator slab further comprising multiple photoreceiver arrangements for detecting photons produced by carrier recombination in the well material, said photoreceiver arrangements generating response signals capable of quantifying a number of detected photons.

20. An article of claim 19, wherein each said scintillator slab further comprising an arrangement for analyzing the individual signals generated by said multiple photoreceiver arrangements, said analyzing arrangement adapted for extracting a position of said ionization event within said semiconductor slab.

* * * * *